(12) United States Patent
Li et al.

(10) Patent No.: US 9,771,286 B2
(45) Date of Patent: Sep. 26, 2017

(54) APPARATUS FOR BIOLOGICAL SEWAGE TREATMENT

(71) Applicants: Jinmin Li, Shandong (CN); Liankui Zhou, Shandong (CN); Dayong Li, Shandong (CN)

(72) Inventors: Jinmin Li, Shandong (CN); Liankui Zhou, Shandong (CN); Dayong Li, Shandong (CN)

( * ) Notice: Subject to any disclaimer, the term of this patent is extended or adjusted under 35 U.S.C. 154(b) by 291 days.

(21) Appl. No.: 14/413,179

(22) PCT Filed: Jul. 5, 2013

(86) PCT No.: PCT/CN2013/078850
§ 371 (c)(1),
(2) Date: Jan. 6, 2015

(87) PCT Pub. No.: WO2014/005540
PCT Pub. Date: Jan. 9, 2014

(65) Prior Publication Data
US 2015/0166381 A1   Jun. 18, 2015

(30) Foreign Application Priority Data

Jul. 6, 2012  (CN) .................... 2012 2 0327781 U
Feb. 7, 2013  (CN) .......................... 2013 1 0049695
Feb. 7, 2013  (CN) .......................... 2013 1 0049813

(51) Int. Cl.
*C02F 3/30* (2006.01)
*C02F 3/12* (2006.01)
(Continued)

(52) U.S. Cl.
CPC ............ *C02F 3/1278* (2013.01); *C02F 3/302* (2013.01); *C02F 1/20* (2013.01); *C02F 3/223* (2013.01);
(Continued)

(58) Field of Classification Search
None
See application file for complete search history.

(56) References Cited

U.S. PATENT DOCUMENTS

| 3,396,102 A * | 8/1968 | Forrest ...................... C02F 3/12 |
| | | 210/195.3 |
| 6,063,273 A | 5/2000 | Habets |
| 2005/0221468 A1 * | 10/2005 | MacKrell .................. B09C 1/02 |
| | | 435/262.5 |

FOREIGN PATENT DOCUMENTS

| CN | 1986451 A | 6/2007 |
| CN | 200949077 Y | 9/2007 |

(Continued)

*Primary Examiner* — Chester Barry
(74) *Attorney, Agent, or Firm* — Novick, Kim & Lee, PLLC; Allen Xue

(57) ABSTRACT

The present invention relates to an apparatus for biological sewage treatment, including a concentrated mixed liquor driving device that uses a gas to drive a concentrated mixed liquor to flow. The present invention further relates to a method for biological sewage treatment, including a step of using a gas to drive a concentrated mixed liquor to flow. The gas can be an aeration gas, especially an oxygen-containing aeration gas after aeration treatment. The apparatus and method of the present invention can sufficiently utilize the energy and oxygen of the aeration gas, so that the energy consumption and maintenance cost of whole apparatus are reduced, biological sewage treatment effects are improved, and sludge floating is prevented. In addition, the apparatus of present invention has advantages of high performance, energy saving, high reliability, and good movability.

19 Claims, 6 Drawing Sheets

(51) Int. Cl.
*C02F 1/20* (2006.01)
*C02F 3/22* (2006.01)

(52) U.S. Cl.
CPC ...... *C02F 2203/00* (2013.01); *C02F 2301/04* (2013.01); *Y02W 10/15* (2015.05)

(56) References Cited

FOREIGN PATENT DOCUMENTS

| | | |
|---|---|---|
| CN | 102372379 A | 3/2012 |
| CN | 102531298 A | 7/2012 |
| CN | 202898108 U | 4/2013 |
| CN | 102399683 B | 5/2013 |
| GB | 1449558 A | 9/1976 |
| GB | 2144407 A | 3/1985 |
| JP | H02-009495 A | 1/1990 |
| JP | H06-142690 A | 5/1994 |
| WO | 2009/108032 A1 | 9/2009 |

\* cited by examiner

APPARATUS FOR BIOLOGICAL SEWAGE TREATMENT

This patent application claims priority of the following patent applications: (1) Chinese Patent Application: 201220327781.1, which application date is Jul. 6, 2012; (2) Chinese Patent Application: 201310049813.5, which application date is Feb. 7, 2013; and (3) Chinese Patent Application: 201310049695.8, which application date is Feb. 7, 2013. The contents of all these patent applications are incorporated into the present patent application by reference.

TECHNICAL FIELD

The present invention relates to an apparatus for biological sewage treatment, comprising a concentrated mixed liquor driving device that uses a gas to drive a concentrated mixed liquor to flow;

the present invention further relates to a method for biological sewage treatment, comprising using a gas to drive a concentrated mixed liquor to flow.

BACKGROUND ART

In a common apparatus for biological sewage treatment (also called as "sewage bio-treatment", "sewage biological treatment" or "biological treatment of sewage"), a mixed liquor is aerated in an aeration tank, then separated in a sedimentation tank to form a supernatant (also called as "water outflow") and a concentrated mixed liquor (also called as "sludge" or "active sludge"); and, at least a part of the concentrated mixed liquor returns to the aeration tank (also called as "sludge return") and is mixed with a sewage feed (also called as "water inflow"). Usually, sludge return is achieved by using a sludge return pump (e.g., a centrifugal pump). However, sludge return pump needs extra energy and frequent maintenance. In addition, an electric sludge return pump needs further insulating treatment to prevent leakage of electricity. Thus, a sludge return pump has to be disposed at a specific place, which restricts the flexibility of process lay-out, and usually needs a large amount of pipelines for connection, thereby increasing equipment investment and reducing reliability of the whole apparatus. These problems are especially serious in tower-type biological sewage treatment apparatus which has a small floor area and a great height.

Chinese patent application CN102372379A discloses a tower-type biological sewage treatment apparatus, comprising an upflow sludge bed reactor, an aerobic reactor disposed above the upflow sludge bed reactor, and a separator disposed in upper part of the aerobic reactor, in which both of aeration gas and aerated mixed liquor from the aerobic reactor enter a gas-liquor separating tank, and the separated mixed liquor enters a solid-liquor separating zone and is separated to form a supernatant and a concentrated mixed liquor, and the concentrated mixed liquor returns to the aerobic reactor and is mixed with a sewage feed and aerated to form the aerated mixed liquor.

However, when separating an aeration gas and a mixed liquor, or separating a mixed liquor to form a supernatant and a concentrated mixed liquor, a separating device or method in the art is usually unable to achieve desired separation effects. Especially, in a tower-type biological sewage treatment apparatus with limited volume and height, the separation to form a supernatant and a concentrated mixed liquor in a sedimentation tank is difficult, while poor separation even results in sludge floating and breaks sewage treatment process.

Further, during biological sewage treatment process, an air blower for aeration is usually a primary energy-consuming device, and an aeration gas is generally discharged directly to atmosphere after aeration treatment, so that the energy and oxygen in the aeration gas are not sufficiently utilized, which results in higher energy consumption in biological sewage treatment.

Hence, apparatus and method for biological sewage treatment with lower energy consumption, high reliability and high efficiency are still in need.

CONTENTS OF THE INVENTION

One objective of the present invention is to provide an apparatus or method for biological sewage treatment so as to solve the above problems in the art. Thus, the present invention especially provides the following technical solutions:

1. An apparatus for biological sewage treatment, comprising a concentrated mixed liquor driving device that uses a gas to drive a concentrated mixed liquor to flow.

2. The apparatus for biological sewage treatment according to the technical solution 1, wherein the concentrated mixed liquor driving device is disposed to allow the gas to contact with the concentrated mixed liquor.

3. The apparatus for biological sewage treatment according to the technical solution 1 or 2, wherein the concentrated mixed liquor driving device comprises a guiding tube in which the gas and the concentrated mixed liquor enter and are mixed, a gas inlet and a concentrated mixed liquor inlet are set at a lower part of the guiding tube, a gas-liquor mixture conveying section is set at a middle part of the guiding tube, and a gas-liquor mixture outlet is set at a upper part of the guiding tube.

4. The apparatus for biological sewage treatment according to any one of the technical solutions 1-3, wherein the concentrated mixed liquor driving device further comprises a gas-liquor separating device that is fluidly connected with the gas-liquor mixture outlet.

5. The apparatus for biological sewage treatment according to any one of the preceding technical solutions, further comprising an aeration section to provide an aeration gas as the gas.

6. The apparatus for biological sewage treatment according to any one of the preceding technical solutions, further comprising a sedimentation section to provide the concentrated mixed liquor.

7. The apparatus for biological sewage treatment according to any one of the preceding technical solutions, further comprising an anaerobic treatment section, a sedimentation section and an aeration section, wherein the anaerobic treatment section is disposed to receive a sewage feed and the concentrated mixed liquor from the concentrated mixed liquor driving device and to perform anaerobic treatment so as to obtain an anaerobic treatment mixed liquor, the aeration section is disposed to receive the anaerobic treatment mixed liquor and to allow it to contact with an aeration gas to obtain an aeration treatment mixed liquor, the sedimentation section is disposed to receive the aeration treatment mixed liquor which is separated to obtain a supernatant and the concentrated mixed liquor, and the concentrated mixed liquor driving device is disposed to receive the concentrated mixed liquor and to drive the concentrated mixed liquor to flow by using the aeration gas from the aeration section.

8. The apparatus for biological sewage treatment according to technical solution 7, wherein the aeration section has a gas-liquor separating device to separate the aeration treatment mixed liquor and the aeration gas, the gas-liquor separating device is fluidly connected with the sedimentation section to allow the sedimentation section to receive the aeration treatment mixed liquor, and the gas-liquor separating device is disposed to prevent the aeration gas from entering the sedimentation section.

9. The apparatus for biological sewage treatment according to technical solution 7, wherein the anaerobic treatment section, the sedimentation section and the aeration section are disposed so that the apparatus for biological sewage treatment forms a horizontal type apparatus for biological sewage treatment.

10. The apparatus for biological sewage treatment according to any one of the preceding technical solutions, wherein at least a part of the apparatus for biological sewage treatment is disposed below or above the ground, or the apparatus for biological sewage treatment is disposed on a movable platform.

11. The apparatus for biological sewage treatment according to the technical solution 1, wherein the apparatus for biological sewage treatment is a tower-type apparatus for biological sewage treatment which has a sedimentation chamber, the concentrated mixed liquor driving device is a pneumatic mixed liquor elevating device which is used to elevate a concentrated mixed liquor in the sedimentation chamber by using the gas.

12. The apparatus for biological sewage treatment according to the technical solution 11, wherein the pneumatic mixed liquor elevating device is a pneumatic mixed liquor elevating tube, comprising a substantively vertical liquor elevating tube for drawing the concentrated mixed liquor and a gas guiding tube which is fluidly connected with the liquor elevating tube and used for introducing the gas into the liquor elevating tube.

13. The apparatus for biological sewage treatment according to the technical solution 12, wherein the liquor elevating tube has an inlet for drawing the concentrated mixed liquor and an outlet for discharging the gas and the concentrated mixed liquor, and the gas guiding tube is connected with a middle or lower part of the liquor elevating tube.

14. The apparatus for biological sewage treatment according to the technical solution 13, wherein a sludge collecting channel is set at the bottom of the sedimentation chamber, and the inlet of the liquor elevating tube extends into the sludge collecting channel.

15. The apparatus for biological sewage treatment according to any one of the technical solutions 11-14, further comprising a gas-liquor separating tank for separating the concentrated mixed liquor and the gas from the pneumatic mixed liquor elevating tube.

16. The apparatus for biological sewage treatment according to the technical solution 15, wherein the gas-liquor separating tank is fluidly connected with the outlet of the liquor elevating tube.

17. The apparatus for biological sewage treatment according to any one of the technical solutions 11-14, further comprising an aeration chamber, wherein the aeration chamber has a gas collecting hood to collect an aeration gas in the aeration chamber, and at least of the gas is the aeration gas from the gas collecting hood.

18. The apparatus for biological sewage treatment according to the technical solution 17, wherein the gas collecting hood is fluidly connected with the gas guiding tube.

19. The apparatus for biological sewage treatment according to the technical solution 17, wherein the aeration chamber further has a liquor collecting tank to collect a mixed liquor in the aeration chamber, the sedimentation chamber is fluidly connected with the liquor collecting tank, and at least part of the concentrated mixed liquor in the sedimentation chamber is derived from a mixed liquor of the liquor collecting tank.

20. The apparatus for biological sewage treatment according to the technical solution 17, further comprising a division plate disposed between the aeration chamber and the sedimentation chamber.

21. The apparatus for biological sewage treatment according to the technical solution 20, wherein the division plate defines a roof of the liquor collecting tank, and the corresponding part of the division plate has a hole or a pipeline through which the mixed liquor in the liquor collecting tank enters the sedimentation chamber.

22. The apparatus for biological sewage treatment according to the technical solution 17, wherein a first concentrated mixed liquor return pipe for introducing the concentrated mixed liquor of the gas-liquor separating tank into the aeration chamber is disposed between the gas-liquor separating tank and the aeration chamber.

23. The apparatus for biological sewage treatment according to the technical solution 17, further comprising an anaerobic reaction chamber as disposed below the aeration chamber, wherein a second concentrated mixed liquor return pipe for introducing the concentrated mixed liquor of the gas-liquor separating tank into the anaerobic reaction chamber is disposed between the gas-liquor separating tank and the anaerobic reaction chamber.

24. The apparatus for biological sewage treatment according to any one of the preceding technical solutions, further comprising a power room or a power chamber and a heat exchanger, wherein the heat exchanger heats a mixed liquor in the apparatus for biological sewage treatment by using a heat released from a power device in the power room.

25. The apparatus for biological sewage treatment according to the technical solution 24, wherein the power room and the heat exchanger are disposed in the anaerobic reaction chamber and/or the aeration chamber, the power room is internally equipped with the power device and has an air inlet fluidly connecting with atmosphere and an air outlet fluidly connecting with the heat exchanger, and a gas heated with the power device in the power room exchanges heat with the mixed liquor in the anaerobic reaction chamber and/or the aeration chamber via the heat exchange.

26. The apparatus for biological sewage treatment according to the technical solution 24, wherein the air inlet has a gas distributing device to control the distribution of a gas entering the power room.

27. The apparatus for biological sewage treatment according to the technical solution 25, wherein the power device is a pump and/or an air blower.

28. The apparatus for biological sewage treatment according to any one of the technical solutions 24-27, wherein the heat exchanger is one or more selected from spiral tube heat exchangers, straight tube heat exchangers or combinations thereof.

29. The apparatus for biological sewage treatment according to any one of the technical solutions 24-28, wherein the power room is further equipped with an instrument, a switch and/or a valve for monitoring and controlling the apparatus for biological sewage treatment.

30. The apparatus for biological sewage treatment according to any one of the preceding technical solutions, further comprising a sludge lump breaking device in the sedimentation section or the sedimentation chamber. In some embodiments of the present invention, the sludge lump breaking device is an aerator or a gas distributor.

31. A method for biological sewage treatment, comprising using a gas to drive a concentrated mixed liquor to flow. In some embodiments of the method for biological sewage treatment according to the present invention, the method is performed by using the apparatus for biological sewage treatment according to any one of the technical solutions 1-30.

32. The method for biological sewage treatment according to technical solution 31, wherein at least part of the gas is an oxygen-containing gas, especially an aeration gas.

33. The method for biological sewage treatment according to any one of technical solutions 31-32, wherein the concentrated mixed liquor is from a sedimentation section.

34. The method for biological sewage treatment according to any one of technical solutions 31-33, further comprising introducing a sewage feed and the concentrated mixed liquor to an anaerobic treatment section to perform anaerobic treatment and obtain an anaerobic treatment mixed liquor, introducing the anaerobic treatment mixed liquor to an aeration section and contacting with an aeration gas to obtain an aeration treatment mixed liquor, introducing the aeration treatment mixed liquor to a sedimentation section to obtain a supernatant and the concentrated mixed liquor, and using the aeration gas collected from the aeration section as the gas to drive the concentrated mixed liquor to flow.

35. The method for biological sewage treatment according to any one of technical solutions 31-34, wherein the gas is an oxygen-containing gas, and the gas contacts with the concentrated mixed liquor.

36. A method for biological sewage treatment, comprising using the tower type apparatus for biological sewage treatment according to any one of technical solutions 11-30 to perform the biological sewage treatment. In some embodiments, a gas is used to elevate a concentrated mixed liquor in a sedimentation section or sedimentation chamber. In some embodiments, the concentrated mixed liquor is elevated by a pneumatic mixed liquor elevating device using the gas. In further some embodiments, the concentrated mixed liquor is from a sedimentation chamber of a tower-type apparatus for biological sewage treatment.

37. The method for biological sewage treatment according to claim 36, wherein at least part of the gas is from an aeration gas.

38. The method for biological sewage treatment according to claim 36, further comprising collecting a mixed liquor and an aeration gas from an aeration chamber, subjecting the mixed liquor to sedimentation treatment in the sedimentation device to obtain a supernatant and a concentrated mixed liquor, and elevating the concentrated mixed liquor in the pneumatic mixed liquor elevating device using the aeration gas.

39. The method for biological sewage treatment according to any one of claims 36-38, further comprising separating in a gas-liquor separating tank the aeration gas and the concentrated mixed liquor from the pneumatic mixed liquor elevating device, and introducing at least part of the separated concentrated mixed liquor to the aeration chamber.

40. The method for biological sewage treatment according to any one of claims 36-38, further comprising subjecting a supernatant in the sedimentation chamber to aeration treatment periodically or when a sludge lump appears or is about to appear in the supernatant in the sedimentation chamber.

41. The method for biological sewage treatment according to any one of claims 36-38, further comprising introducing at least part of the concentrated mixed liquor of the sedimentation chamber to an anaerobic reaction chamber.

42. The method for biological sewage treatment according to any one of claims 36-38, further comprising a step of heating a mixed liquor using a heat released from power device. In some embodiments, the step is performed in an anaerobic reaction chamber, an aeration chamber of a sedimentation chamber by using a heat exchanger.

In some embodiments of the apparatus for biological sewage treatment according to the present invention, the concentrated mixed liquor driving device uses the gas to drive the concentrated mixed liquor to flow, wherein the gas can directly contact the concentrated mixed liquor, preferably the gas is mixed with the concentrated mixed liquor, so that the gas entraps the concentrated mixed liquor and floats upward, thereby driving the concentrated mixed liquor to flow. In some embodiments, the concentrated mixed liquor driving device is a concentrated mixed liquor return device.

In some embodiments, the concentrated mixed liquor driving device comprises a guiding tube to receive the gas and the concentrated mixed liquor, the guiding tube has a gas inlet, a mixed liquor inlet and a gas-liquor mixture outlet. When the gas enters the guiding tube via the gas inlet and the concentrated mixed tube enters the guiding tube via the mixed liquor inlet, they are mixed in the guiding tube to form a gas-liquor mixture which flows upward under the pressure and floating effects of the gas and then is discharged from the gas-liquor mixture outlet, so that the concentrated mixed liquor is driven to flow. In some embodiments, the guiding tube is tilted upward or stands substantively vertically to facilitate the gas floating upward.

In some embodiments, the gas inlet of the guiding tube is fluidly connected with a suitable gas source, and a flow control valve is used to control the gas flow entering the guiding tube so as to control the flow of the concentrated mixed liquor. In some other embodiments, a flow control valve is set at upstream of the mixed liquor inlet of the guiding tube to control the flow of the concentrated mixed liquor that enters the guiding tube.

In some embodiments, the gas can be derived from any suitable gas sources, for example, the gas can be derived from an air compressor, an air blower, a storage tank of gas such as air, oxygen, nitrogen and inert gas. Preferably, the gas has a pressure greater than or equal to atmosphere pressure. Preferably, the gas is an oxygen-containing gas. In some cases, at least part of the gas is from an aeration gas. The aeration gas can be collected from any place of an aeration device. Preferably, the aeration gas is an aeration gas released from an aerated mixed liquor and collected from an upper part of an aeration device. Usually, oxygen in an aeration gas would not be depleted during aeration treatment, so that the aeration gas after aeration treatment still contains oxygen. In some cases, an additional sludge return pump is also used to drive the concentrated mixed liquor to flow. In some other cases, the additional sludge return pump is driven by using the gas.

The inventors of the present invention surprisingly find when an oxygen-containing gas such as aeration gas contacts with (preferably is mixed with) a concentrated mixed liquor so as to drive the concentrated mixed liquor to flow, the biological sewage treatment is unexpected improved in aspects of nitrogen removal and/or COD removal. Without being restricted with any known theory, the inventors believe denitrification is enhanced when the concentrated mixed liquor from a sedimentation section firstly contacts with an oxygen-containing gas (preferably an aeration gas) and than is mixed with a sewage feed, so that better effects of nitrogen removal and COD removal are achieved.

In some embodiments, the sedimentation section can be any device that can be used to separate an aerated mixed liquor into a supernatant and a concentrated mixed liquor. Usually, the sedimentation section can be a sedimentation tank or sedimentation basin or sedimentation chamber. In some embodiments, tilted plates or tilted pipes could be set in the sedimentation section to enhance separation effects.

The concentrated mixed liquor usually is formed in the lower part of the sedimentation section or tank or basin or chamber under sedimentation effects, in which sludge collecting channels could be set to enhance the sedimentation of the concentrated mixed liquor. The sedimentation section is fluidly connected with the concentrated mixed liquor driving device via a sludge return pipe. One end of the sludge return pipe can be set in the lower part of the sedimentation section or tank or basin or chamber, preferably in a sludge collecting channel, to draw the concentrated mixed liquor. Another end of the sludge return pipe can be fluidly connected with the mixed liquor inlet of the concentrated mixed liquor deriving device.

In some embodiments, a mixed liquor distributor can be set in the sedimentation section so that the aerated mixed liquor from aeration section is uniformly distributed in the sedimentation section and does not disturb the separation between the supernatant and the concentrated mixed liquor in the sedimentation section. In some cases, an overflow well is set in upper part of the sedimentation section to discharge the supernatant as water outflow.

In the present invention, the anaerobic treatment can be performed by substantively preventing a mixed liquor from contacting any oxygen-containing gas. Usually, anaerobic state is achieved when there is substantively no dissolved oxygen, for example, the dissolved oxygen level is not higher than 0.1 mg/L. In some embodiments of the present invention, the anaerobic treatment section can be any device that allows a mixed liquor of a concentrated mixed liquor and a sewage feed to undergo anaerobic treatment. In some cases, the anaerobic treatment can be performed by allowing the mixed liquor to flow slowly without aeration. A suitable anaerobic treatment section can be a tank or basin or chamber in which the mixed liquor can flow in laminar, vertical or radial manner.

In some embodiments of the present invention, the aeration section can be a device in which the mixed liquor can be subjected to aeration treatment, for example, an aeration tank or aeration basin or aeration chamber. An aerator can be set in the aeration section to enhance aeration treatment. The aerator can be for example a spiral aerator, micropore aerator, plate-type aerator, rotation mixing aerator, tube aerator, or jet aerator.

In some cases, the aeration section is disposed so that an anaerobic treatment mixed liquor from the anaerobic treatment section enters a first end of the aeration section, while the aeration treatment mixed liquor after aeration treatment is discharged from a second end of the aeration treatment section and enters in the sedimentation section, where the first end and the second end of the aeration section are disposed so that they are as far as possible between each other to avoid channeling and short circuiting. In some other cases, a baffle plate is set in the aeration section to further enhance aeration treatment and avoid channeling and short circuiting.

In some cases, at least part, preferably all, of the aeration gas in the aeration treatment section is collected and introduced to the concentrated mixed liquor driving device. In some cases, a gas-liquor separating device is set at the second end of the aeration section to separate aeration gas and the aerated mixed liquor so that the aerated mixed liquor enters the sedimentation section while the aeration gas does not enter the sedimentation section. The gas-liquor separating device can be any device that can perform the separation between the aeration gas and the aerated mixed liquor. For example, the gas-liquor separating device can be one or more containers or tubes, which top has one or more openings to allow the aerated mixed liquor to enter the containers or tubes, and which bottom has a pipe fluidly connected with the sedimentation section to allow the aerated mixed liquor in the containers or tubers to enter the sedimentation section. In some cases, the openings of the containers or tubers are immerged into the aerated mixed liquor of the aeration section to receive the aerated mixed liquor and prevent the aeration gas entering the sedimentation section.

In some embodiments, a gas collecting device is set in the aeration section to collect an aeration gas. The gas collecting device is fluidly connected with the gas inlet of the guiding tube of the concentrated mixed liquor driving device. In some embodiments, the gas collecting device comprises a gas collecting hood, optionally above an aeration device, and a gas guiding pipe can be set on top of the gas collecting hood to introduce the gas collected by the gas collecting hood to the guiding tube via the gas inlet of the guiding tube. In some embodiments, a flow control valve is set on the gas guiding pipe to control the flow of gas entering the guiding tube so as to further control the flow of the concentrated mixed liquor. In some cases, an atmospheric vent is set on the gas collecting hood to discharge at least part of the gas collected by the gas collecting hood, and a flow control valve can be set on the atmospheric vent to control the flow or proportion of the discharged gas so as to further control the flow of gas entering the guiding tube and control the flow of the concentrated mixed liquor.

In some embodiments, the gas collecting hood can be set at middle part or upper part or top of the aeration section. In some cases, a part of the gas collecting hood can extend upward and protrude out of the top wall of the aeration section to form a gas collecting pocket, and at least part of the wall of the gas-collecting hood is defined by the wall of the aeration section. In some cases, the gas collecting hood can be an independent umbrella-type hood in the aeration section. In some other cases, the gas collecting hood is defined by the top wall or roof of the aeration section and optionally by side wall connecting with the top or roof of the aeration section.

In some embodiments of the apparatus for biological sewage treatment of the present invention, the anaerobic treatment section, the sedimentation section and the aeration section can be disposed in one horizontal barrel. The barrel can be a cylindrical or polygonal barrel, preferably a tetragonal, pentagonal, hexagonal, heptagonal, octagonal barrel or even a more polygonal barrel.

In some embodiments of the apparatus for biological sewage treatment according to the present invention, a device for supplying the gas, such as an air blower for supplying aeration gas, and/or a device for supplying sewage feed, such as sewage feed pump or vacuum sewage drawing device (including vacuum pump) can be internally set in the apparatus for biological sewage treatment, for example, in the anaerobic treatment section, sedimentation section and/or aeration section, preferably in the aeration section. The advantages of such arrangement at least include reducing noise, facilitating arrangement and installation, and deployment in an area such as a residential area with large population and small space.

In some embodiments of the apparatus for biological sewage treatment according to the present invention, at least part of the apparatus for biological sewage treatment is set below the ground. For example, at least part of or even the whole of the apparatus for biological sewage treatment according to the present invention can be set below the ground, for example, set in a semi-basement or a basement, to save land occupation, reduce noise and avoid influence on landscape. In some cases, the apparatus for biological sewage treatment can be set on the ground. When the apparatus for biological sewage treatment according to the present invention is set on the ground or in a semi-basement, it can be set outdoors or in a building. In some other cases, the apparatus for biological sewage treatment according to the present invention can be set on a movable platform, for example on a vehicle such as a trailer or truck, so that it can be readily and flexibly transported to different sites, and quickly deployed and installed to provide instant service.

The apparatus and method for biological sewage treatment according to the present invention sufficiently uses an aeration gas in biological sewage treatment, so that a sludge return pump is not used, energy consumption and equipment investment are reduced, apparatus disposal and process layout are flexible, movable parts and connecting pipes are reduced, and reliability is improved.

In the apparatus and method for biological sewage treatment according to the present invention, the concentrated mixed liquor contacts with an oxygen-containing aeration gas such as an aeration gas so as to enhance effects of removing nitrogen and COD and improve sewage treatment effects. Hence, the apparatus and method for biological sewage treatment according to the present invention had advantages of good quality of water outflow, high volumetric loading, less occupation of land, and less influences on neighboring environment.

According to the present invention, the apparatus for biological sewage treatment can be a tower type apparatus for biological sewage treatment, comprising a sedimentation chamber and a pneumatic mixed liquor elevating device using a gas to elevate a concentrated mixed liquor of the sedimentation chamber, in which the pneumatic mixed liquor elevating device is used as a concentrated mixed liquor driving device, and elevating a concentrated mixed liquor pertains to driving a concentrated mixed liquor to flow.

In some embodiments of the present invention, the sedimentation chamber can be a sedimentation device capable of separating an aerated mixed liquor to form a supernatant and a concentrated mixed liquor. In general, the sedimentation chamber is a sedimentation tank or sedimentation basin or sedimentation section, in which tilted plates or tilted pipes could be set to enhance separation effects. The concentrated mixed liquor usually is formed in the lower part of the sedimentation device under sedimentation effects, in which sludge collecting channels could be set to enhance the sedimentation of the concentrated mixed liquor. In some cases, an overflow well is set in upper part of the sedimentation device to discharge the supernatant as water outflow.

In some embodiments of the present invention, the pneumatic mixed liquor elevating device of the tower type apparatus for biological sewage treatment is any suitable device capable of elevating a concentrated mixed liquor by using a gas, preferably a pneumatic mixed liquor elevating device allowing contact between the gas and the mixed liquor, for example, a pneumatic pump or a pneumatic mixed liquor elevating tube. In some cases, the pneumatic mixed liquor elevating tube comprises a substantively vertical liquor elevating tube for drawing the concentrated mixed liquor, and a gas guiding pipe which is connected with the liquor elevating tube and used for introducing the gas to the liquor elevating tube.

In some embodiment of the present invention, the liquor elevating tube has an liquor inlet for drawing the concentrated mixed liquor and an outlet for discharging a gas-liquor mixture of the gas and the concentrated mixed liquor, and the gas guiding pipe is connected with a middle part or lower part of the liquor elevating tube. When the gas enters the liquor elevating tube via the gas guiding pipe, the gas is mixed with the concentrated mixed liquor to form a gas-liquor mixture, and the gas-liquor mixture in the liquor elevating tube flows upward under the action of pressure and floating effects of the gas, and then is discharged from the outlet at the top of the liquor elevating tube, so that the concentrated mixed liquor is pneumatically elevated by using the gas. In some cases, sludge circulation in the whole apparatus for biological sewage treatment is fulfilled by elevating the concentrated mixed liquor with the gas.

In some embodiments, the gas guiding pipe is fluidly connected with a suitable gas source, and a flow control valve is used to control the gas flow entering the gas guiding pipe so as to control the flow of the concentrated mixed liquor to be elevated. In some other embodiments, a flow control valve is set at upstream of the inlet of the liquor elevating tube to control the flow of the concentrated mixed liquor that enters the liquor elevating tube.

In some embodiments, the gas can be derived from any suitable gas sources, for example, the gas can be from an air compressor, an air blower, a storage tank of gas such as air, oxygen, nitrogen and inert gas. Preferably, the gas has a pressure greater than or equal to atmosphere pressure.

Preferably, the gas is an oxygen-containing gas. In some cases, at least part of the gas is from an aeration gas. The aeration gas can be collected from any place of an aeration device. Preferably, the aeration gas is an aeration gas released from an aerated mixed liquor and collected from an upper part of an aeration device. In some cases, an additional sludge return pump is used to elevate the concentrated mixed liquor in the sedimentation chamber. In some other cases, the additional sludge return pump is driven by using the gas.

In some embodiments of the present invention, a sludge collecting channel is set at the bottom of the sedimentation chamber, and the liquor inlet of the liquor elevating tube protrudes into the sludge collecting channel. In some embodiments, one or more pneumatic mixed liquor elevating tubes are set in the sedimentation chamber. In some cases, a plurality of pneumatic mixed liquor elevating tubes can protrude into one or more sludge collecting channels. Using a plurality of pneumatic mixed liquor elevating tube can enhance transportation ability of the concentrated mixed liquor, and improve the contact between the gas and the concentrated mixed liquor.

In some embodiments of the present invention, the tower-type apparatus for biological sewage treatment further comprises a gas-liquor separating tank to separate the concentrated mixed liquor and the gas from the pneumatic mixed liquor elevating device, and the gas-liquor separating tank can be fluidly connected with the outlet of the liquor elevating tube.

In some embodiments of the present invention, the tower-type apparatus for biological sewage treatment further comprises an aeration chamber, and the aeration chamber has a gas collecting hood for collecting an aeration gas in the aeration chamber. In some embodiments of the present invention, the aeration chamber can be a device capable of performing aeration treatment of the mixed liquor, for example, an aeration tank or aeration basin or aeration section. An aerator can be set in the aeration chamber to enhance aeration treatment. The aerator can be one or more of spiral aerator, micropore aerator, plate-type aerator, rotation mixing aerator, tube aerator, or jet aerator.

In some cases, at least part, preferably all, of the aeration gas in the aeration chamber is collected and introduced to the concentrated mixed liquor elevating device. In some cases, a gas-liquor separating device is set in the aeration chamber to separate aeration gas and the aerated mixed liquor so that the aerated mixed liquor enters the sedimentation chamber and the aeration gas does not enter the sedimentation chamber. The gas-liquor separating device can be one or more containers or one or more tubes, which top has one or more openings to allow the aerated mixed liquor to enter the containers or tubes, and which bottom has one or more pipes fluidly connected with the sedimentation chamber to allow the aerated mixed liquor in the containers or tubes to enter the sedimentation chamber. In some cases, the openings of the containers or tubes are immerged into the aerated mixed liquor of the aeration chamber to receive the aerated mixed liquor and prevent the aeration gas from entering the sedimentation chamber.

In some embodiments, a gas collecting device is set in the aeration chamber to collect an aeration gas. The gas guiding pipe is connected with the gas collecting device. The gas collecting device can comprise a gas collecting hood optionally disposed above an aeration device. According to some embodiments of the present invention, the gas collecting hood is fluidly connected with the gas guiding pipe. For example, the gas guiding pipe is set on the top of the gas collecting hood to allow the gas collected by the gas collecting hood to enter the mixed liquor elevating device. In some embodiments, a flow control value is set on the gas guiding pipe to control the flow of gas entering the liquor elevating tube so as to control the flow of the concentrated mixed liquor. In some cases, the gas collecting hood further has an atmospheric vent to discharge at least part of the gas collected by the gas collecting hood. A control valve can be set on the atmospheric vent to control the flow or proportion of the gas to be discharged.

In some embodiments, the gas collecting hood is set in a middle part or upper part of the aeration chamber. In some cases, a part of the gas collecting hood can extend upward and protrude out of the top wall of the aeration section to form a gas collecting pocket, and at least part of the wall of the gas-collecting hood is defined by the wall of the aeration section. In some cases, the gas collecting hood can be an independent umbrella-type hood in the aeration section. In some other cases, the gas collecting hood is defined by the top wall of the aeration section and optionally by side wall connecting with the top wall of the aeration section.

In some embodiments of the present invention, the aeration chamber further has a liquor collecting tank to collect a mixed liquor in the aeration chamber, the liquor collecting tank is fluidly connected with the sedimentation chamber, and at least part of the concentrated mixed liquor is derived from the mixed in the liquor collecting tank.

In some embodiments of the present invention, the tower type apparatus for biological sewage treatment further comprises a division plate between the aeration chamber and the sedimentation chamber. The division plate can be a flat plate, a cone type plate, an inverted cone type plate, a folded plate or any suitable sketch plate. The cone type plate or the inverted cone type plate may have an apex angle of about 60° to about 179°, for example, about 70° to about 150°, about 80° to about 120°, about 85° to about 105°, or about 90°. A relatively small apex angle can increase the height of the sedimentation chamber, which facilitates separation of the mixed liquor to form a supernatant and a concentrated mixed liquor; while a relatively large apex angle can facilitate the arrangement and installation of devices in the aeration chamber and the sedimentation chamber. In some cases, the apex angle is about 69°, about 70°, about 80°, about 100°, about 120°.

In some embodiments of the tower type apparatus for biological sewage treatment of the present invention, the gas collecting hood is one or more gas collecting hoods formed by one or more upward protruding parts of the division plate. In some embodiments, the gas collecting hood is one or more gas collecting hoods formed by one or more upward protruding parts located at a margin of the division plate, or formed by a circular groove consisting of a marginal part of the inverted cone type division plate and an internal wall of the aeration chamber.

According to some embodiments of the tower type apparatus of the present invention, the liquor collecting tank is located in the middle part of the division plate. In some cases, the liquor collecting tank has upward openings and has a gap between the liquor collecting tank and the lower surface of the division plate to allow the mixed liquor enter the liquor collecting tank and to prevent the aeration gas from entering the liquor collecting tank. This arrangement facilitates the separation between the aeration gas and the mixed liquor.

According to some embodiments of the tower type apparatus for biological sewage treatment of the present invention, the liquor collecting tank has a top defined by a part of the division plate, and this part of the division has one or more through holes or pipes to allow the mixed liquor in the liquor collecting tank to enter the sedimentation chamber. In some cases, the through holes or pipes are disposed to prevent the aeration gas from entering the sedimentation chamber via the through holes or pipes. For example, the through holes can be sheltered by the liquor collecting tank to prevent the aeration gas entering the sedimentation chamber via the through holes.

According to some embodiments of the tower type apparatus for biological sewage treatment of the present invention, the middle part of the division plate protrudes downward to form a recess part as a sludge collecting tank at the bottom of the sedimentation chamber. Thus, the concentrated mixed liquor in the sedimentation chamber enters the sludge collecting tank under action of gravity. Preferably, the inlet of the liquor elevating tube protrudes into the sludge collecting tank.

According to some embodiments of the tower type apparatus for biological sewage treatment of the present invention, a mixed liquor distributor is set in the lower part of the sedimentation chamber to distribute uniformly the mixed liquor from the liquor collecting tank in the lower part of the sedimentation chamber. In some embodiments, the mixed liquor distributor is a substantively horizontal annular tube having a plurality of downward openings, or a substantively horizontal overturned annular groove as defined by the outer wall of the gas-liquor separating tank and a skirt which is joined to the outer wall of the gas-liquor separating tank and protrudes obliquely downward inside the lower part of the sedimentation chamber. The mixed liquor distributor can uniformly distribute the mixed liquor from the liquor collecting tank in the sedimentation chamber, and substantively do not disturb the separation of the mixed liquor to form the supernatant and the concentrated mixed liquor.

According to some embodiments of the tower type apparatus for biological sewage treatment of the present invention, the gas-liquor separating tank is an annular tank between the liquor elevating tube and a concentric external sleeve. The lower part of the gas-liquor separating tank is fluidly connected with the lower part of the aeration tank so that the concentrated mixed liquor in the gas-liquor separating tank returns to the lower part of the aeration tank. In some other embodiments, the gas-liquor separating tank is an independent tank or tube, which upper part is fluidly connected with the outlet of the liquor elevating tube to receive the concentrated mixed liquor and the gas from the liquor elevating tube, and which lower part is fluidly connected with the lower part of the aeration chamber so that the concentrated mixed liquor in the gas-liquor separating tank can return the lower part of the aeration chamber.

According to some embodiments of the tower type apparatus for biological sewage treatment of the present invention, a first concentrated mixed liquor return pipe is set between the gas-liquor separating tank and the aeration chamber, so that the concentrated mixed liquor from the gas-liquor separating tank can return the aeration chamber via the first concentrated mixed liquor return pipe.

According to some embodiments of the tower type apparatus for biological sewage treatment of the present invention, an anaerobic reaction chamber or anaerobic treatment section is set below the aeration chamber.

In the present invention, the anaerobic reaction chamber or anaerobic treatment section can be any device capable of performing anaerobic treatment of a mixed liquor formed with the concentrated mixed liquor and a sewage feed. In some other embodiments, the anaerobic reaction chamber is any device capable of performing anaerobic treatment of a sewage feed. In some cases, the anaerobic treatment is performed by allowing the mixed liquor to flow slowly under a state with a dissolving oxygen level of not greater than 0.1 mg/L, for example a state without aeration. A suitable anaerobic treatment chamber or section can be a tank or basin in which the mixed liquor can flow in laminar, vertical or radial manner. For example, the anaerobic reaction chamber can be an upflow anaerobic sludge blanket (UASB) reactor, comprising a mixing zone at the bottom thereof, a gas collecting zone for collecting methane bubbles at top thereof, and an anaerobic reaction zone between the mixing zone and the gas collecting zone.

According to some embodiments of the tower type apparatus for biological sewage treatment of the present invention, a second concentrated mixed liquor return pipe is set in the lower part (preferably the sludge collecting tank) of the sedimentation chamber to discharge at least part of the concentrated mixed liquor out of the sedimentation chamber and the aeration chamber. In some cases, a pump is used to discharge compulsively a part of the concentrated mixed liquor. In some cases, the discharged concentrated mixed liquor is introduced into the anaerobic reaction chamber below the aeration chamber, preferably into the lower part of the anaerobic reaction chamber. When the interface between the supernatant and the concentrated mixed liquor in the sedimentation chamber is at a relatively high position or sludge floating is about to occur or occurs already in the sedimentation chamber, a part or the whole of the concentrated mixed liquor is discharged via the second concentrated mixed liquor return pipe and/or the first concentrated mixed liquor return pipe so as to lower the interface quickly and effectively and to avoid or eliminate sludge lump formation and sludge floating.

According to some embodiments of the tower type apparatus for biological sewage treatment of the present invention, a sludge lump breaking device is set in the sedimentation chamber. During a long-term run of the apparatus for biological sewage treatment, an amount of sludge may keep in suspension state without settling to the lower part of the sedimentation chamber and agglomerate to form a sludge lump that is prone to floating upward under anaerobic environment of the sedimentation chamber and discharging along with the water outflow to compromise water quality. The sludge lump may be broken by performing intermittent aeration treatment so as to improve sludge settling property and to avoid compromising water quality. The sludge lump breaking device is any suitable device capable of breaking a sludge lump into pieces such as sludge particles which are easy of sedimentation. In some cases, the sludge lump breaking device is a device using mechanical force to break sludge lump, for example, is a pneumatic sludge lump breaking device, such as any suitable aerator, or a gas distributor, such as a gas distributor tube with upward openings. In some cases, the sludge lump breaking device is actively joined to the sedimentation chamber, which can enter or leave or stay at any desired position in the sedimentation chamber.

According to some embodiments of the present invention, the apparatus for biological sewage treatment further comprises a power room and a heat exchanger, in which the heat exchanger uses a heat released from a power device or equipment in the power room to heat the mixed liquor in the apparatus for biological sewage treatment. The power room and the heat exchanger are preferably set in the aeration chamber or section and/or the anaerobic reaction chamber or section and/or the sedimentation chamber or section, in which the heat exchanger uses a heat released from a power device in the power room to heat the mixed liquor. The heat exchanger can be any suitable heat exchanger, especially a heat exchanger capable of exchanging heat between a gas and the mixed liquid, for example, the heat exchanger can be selected from spiral tube heat exchangers, straight tube heat exchangers or combinations thereof. The power device can be any power device used in the apparatus for biological sewage treatment, such as air blower, a sewage feed pump or a vacuum pump of vacuum water drawing device as well as relevant control or monitoring devices and instruments.

In some embodiments, the gas heated in the power room enters in a heat exchanging tube of the heat exchanger to perform heat exchange with a mixed liquor externally flowing through the heat exchanging tube. In some other embodiments, the gas enters a jacket of the heat exchanger to perform heat exchange with a mixed liquor flowing through the heat exchanging tube. In some cases, the heat exchanger has one or more heat exchanging tubes.

In some embodiments, a gas distributor is set in the power room to control the distribution of gas in the power room. In some cases, the gas distributor is a cover plate with one or more air outlets at edge of the cover plate, in which at least one of the air outlets is oriented toward a power device in the power room. In some cases, the gas distributor can be a grille with tilted baffles to guide air toward a power device in the power room.

In some embodiments, the power device can be any suitable power device useful in biological sewage treatment, such as pumps and/or air blowers, particularly sludge feed pump, mixed liquor circulating pump, aeration air blower, etc.

In some embodiments, an air inlet is set at the bottom of the power room and an air outlet is set at the top of the power room so that the air passes the power room and the heat exchanger in a natural convective manner.

In some embodiments, a forced air supplying device is set in the power room and/or the heat exchanger so as to force the air pass through the power room and the heat exchanger. For example, the forced air supplying device is an air blower, such as axial flow ventilator.

In some embodiments, the gas inlet of the power room is set at the lowest place of the power room so that a liquid deposited in the power room may be drained via the air inlet. In some cases, the liquid deposited in the power room may be an effusion from a wall between the power room and the anaerobic reaction chamber or a wall between the power room and the aeration chamber, or from a power device or connecting pipes thereof in the power room, or from pipelines or valves. The air inlet as set at the lowest place of the power room can discharge said effusion in time so as to prevent the devices in the power room from water logging.

In some embodiments, instruments, switches and/or valves for monitoring and/or controlling the apparatus can be further set in the power room.

Hence, the apparatus for biological sewage treatment of the present invention has a compact structure, can effectively remove heat released from power devices, and uses the released heat to elevate temperature of a mixed liquor, so that technical effects such as high reaction efficiency, improved treatment effects, energy saving and noise reduction are achieved.

The apparatus for biological sewage treatment of the present invention can be arranged in vertical type or horizontal type, which is suitable for placing in a building or embedding under the ground, or setting on a movable platform. In addition, the apparatus for biological sewage treatment of the present invention is particularly suitable for miniaturization and communitization of sewage treatment.

In some embodiments of the apparatus for biological sewage treatment of the present invention, the sedimentation chamber and the aeration chamber and/or the anaerobic reaction chamber can be set in a tower type barrel. The barrel can be a cylindrical or polygonal barrel, preferably tetragonal, pentagonal, hexagonal, heptagonal, octagonal barrel or even a more polygonal barrel.

In the context, "downward" refers to a direction substantively identical to the gravity direction, comprising but not being limited to a direction coincident with the gravity direction; and "upward" refers to a direction substantively against the gravity direction, comprising but not being limited to a direction coincident with the reverse direction of gravity.

In the context, "substantive" or "substantively" means when a term is modified by it, the term can change within a suitable range around the central value of the term, for example, the range can be defined by, for example, ±20%, ±15%, ±10%, ±5%, ±2%, or ±1% of the central value.

Another aspect of the present invention provides a method for biological sewage treatment, comprising using a gas to elevate a concentrated mixed liquor in a sedimentation chamber. In some embodiments, at least a part of the gas is derived from an aeration gas.

In some embodiments, the method for biological sewage treatment of the present invention further comprises the following steps: separately collecting a mixed liquor and an aeration gas from an aeration chamber, performing sedimentation treatment of the mixed liquor in the sedimentation chamber to obtain a supernatant and the concentrated mixed liquor, and elevating the concentrated mixed liquor in a pneumatic mixed liquor elevating device by using the aeration gas collected from the aeration chamber.

The method for biological sewage treatment of the present invention further comprises separating in a gas-liquor separating tank the aeration gas and the concentrated mixed liquor from the pneumatic mixed liquor elevating device, and introducing at least part of the separated concentrated mixed liquor into the aeration chamber.

The method for biological sewage treatment of the present invention further comprises performing aeration treatment of the supernatant in the sedimentation chamber periodically or when a sludge lump appears or is about to appear in the supernatant in the sedimentation chamber. The time or duration time for performing the aeration treatment of the supernatant can be determined according to the situations of sludge lump formation or breaking or floating, as long as the sludge lump is eliminated and sludge lump floating is avoided. Generally, when the aeration treatment of the supernatant is performed, the sewage feed should stop so that sludge does not enter the water outflow.

The method for biological sewage treatment of the present invention further comprises discharging at least a part of the concentrated mixed liquor of the sedimentation chamber to an anaerobic reaction chamber. The concentrated mixed liquor can be discharged before or after being elevated by the gas. The step of introducing the part of the concentrated mixed liquor to the anaerobic reaction chamber can be performed intermittently or continuously. The time and duration time of the step can be determined according to the position of interface between the supernatant and the concentrated mixed liquor and/or the situation of sludge floating, as long as the interface is controlled at a desired position so that sludge does not enter the water outflow. For example, when the interface is at a relatively high position, a part of the concentrated mixed liquor can be introduced to the anaerobic reaction chamber to lower the interface position so as to ensure water quality of the water outflow; when sludge floating occurs or is about to occur, a part or even whole of the concentrated mixed liquor in the sedimentation chamber as well as a part or even whole of the supernatant can be discharged, preferably introduced to the anaerobic reaction chamber, so as to lower the interface or avoid or eliminate sludge floating.

Without being limited to any theory, the inventors believe the main reasons for sludge floating in the sedimentation chamber are as follows: anaerobic decomposition occurs under anaerobic condition and generates methane gas and carbon dioxide gas, and then sludge absorbs gas and floats upward. Hence, periodically performing aeration treatment in intermittent mode can inhibit anaerobic decomposition, break sludge lump, improve sedimentation property of sludge, and effectively avoid occurrence of sludge floating. In addition, a relatively large return flow of the concentrated mixed liquor is achieved by passing an aeration gas through the pneumatic mixed liquor elevating tube, so that the retention time of sludge in the sedimentation chamber is shortened, and the sludge floating caused by anaerobic decomposition under anaerobic condition is avoided as well.

In the apparatus and method for biological sewage treatment of the present invention, the aeration gas and the mixed liquor in the aeration chamber is separated and then introduced to the sedimentation chamber, the aeration gas merely passes through the pneumatic mixed liquor elevating device to elevate the concentrated mixed liquor in the lower part of the sedimentation chamber, so that the process of separating the mixed liquor into the supernatant and the concentrated mixed liquor in the sedimentation chamber is not disturbed by the aeration gas. In the meantime, the concentrated mixed liquor in the lower part of the sedimentation chamber is continuously drown in a relatively great return flow by using the collected aeration gas, which facilitates lowering the position of the interface between the supernatant and the concentrated mixed liquor in the sedimentation chamber, reducing the retention time of sludge in the sedimentation chamber, and avoiding or eliminating sludge floating.

In addition, the concentrated mixed liquor elevated by the pneumatic mixed liquor elevating device passes the gas-liquor separating tank and directly returns to the aeration chamber, rather than the sedimentation chamber, so that the process of separating the mixed liquor into the supernatant and the concentrated mixed liquor in the sedimentation chamber is not disturbed.

Furthermore, the aeration device as set in the sedimentation chamber can periodically aerate the supernatant in the sedimentation chamber, or aerate the supernatant when sludge lump forms or is about to form and/or sludge floating occurs or is about to occur in the supernatant. Thus, the dissolved oxygen concentration around the sludge lump increases, the settling property of sludge is improved, the formation of sludge lump is inhibited, the formed sludge lump is broken, so that the sludge floating is avoided, the separating effects of the sedimentation chamber is improved, and the sedimentation can work stably for a long-term.

Moreover, at least a part of the concentrated mixed liquor in the sedimentation chamber is introduced to the anaerobic reaction chamber, so that the interface between the supernatant and the concentrated mixed liquor in the sedimentation chamber can be readily controlled at a desired position, the water quality of water outflow is assured, and sludge floating can be avoided or eliminated in time.

Further, the inventors of the present invention unexpectedly find when the aeration gas is used to elevate the concentrated mixed liquor, the effects of removing nitrogen and/or removing COD is improved surprisingly. Without being restricted to any theory, the inventors believe that the contact between the concentrated mixed liquor from the sedimentation chamber and the oxygen-containing gas (preferably aeration gas) increases the dissolved oxygen concentration, so that the denitrification ability of sludge is improved, and better effects of removing nitrogen and removing COD are achieved.

In the present invention, the aeration gas is used to perform sludge return, so that a sludge return pump is not used, energy consumption and equipment investment are reduced, and apparatus disposal and process layout are flexible. In addition, when movable parts and connecting pipes are reduced, reliability of the apparatus is improved as well. Further, the apparatus for biological sewage treatment of the present invention has a compact structure, and the volume and floor space of the whole apparatus are reduced.

The apparatus for biological sewage treatment apparatus has a small floor area, can run for a long-term in stable and reliable manner, needs substantively no maintenance, is suitable for placing in a building or embedding under the ground or setting on a removable platform, and is particularly suitable for in-site or on-the-spot sewage treatment, for example sewage treatment in a community or island.

SPECIFIC MODELS FOR CARRYING OUT THE INVENTION

Some embodiments of the present invention are further illustrated in conjunction with the drawings, but it is not intended to restrict the protection scope of the present invention.

EXAMPLE 1

Figure 1:
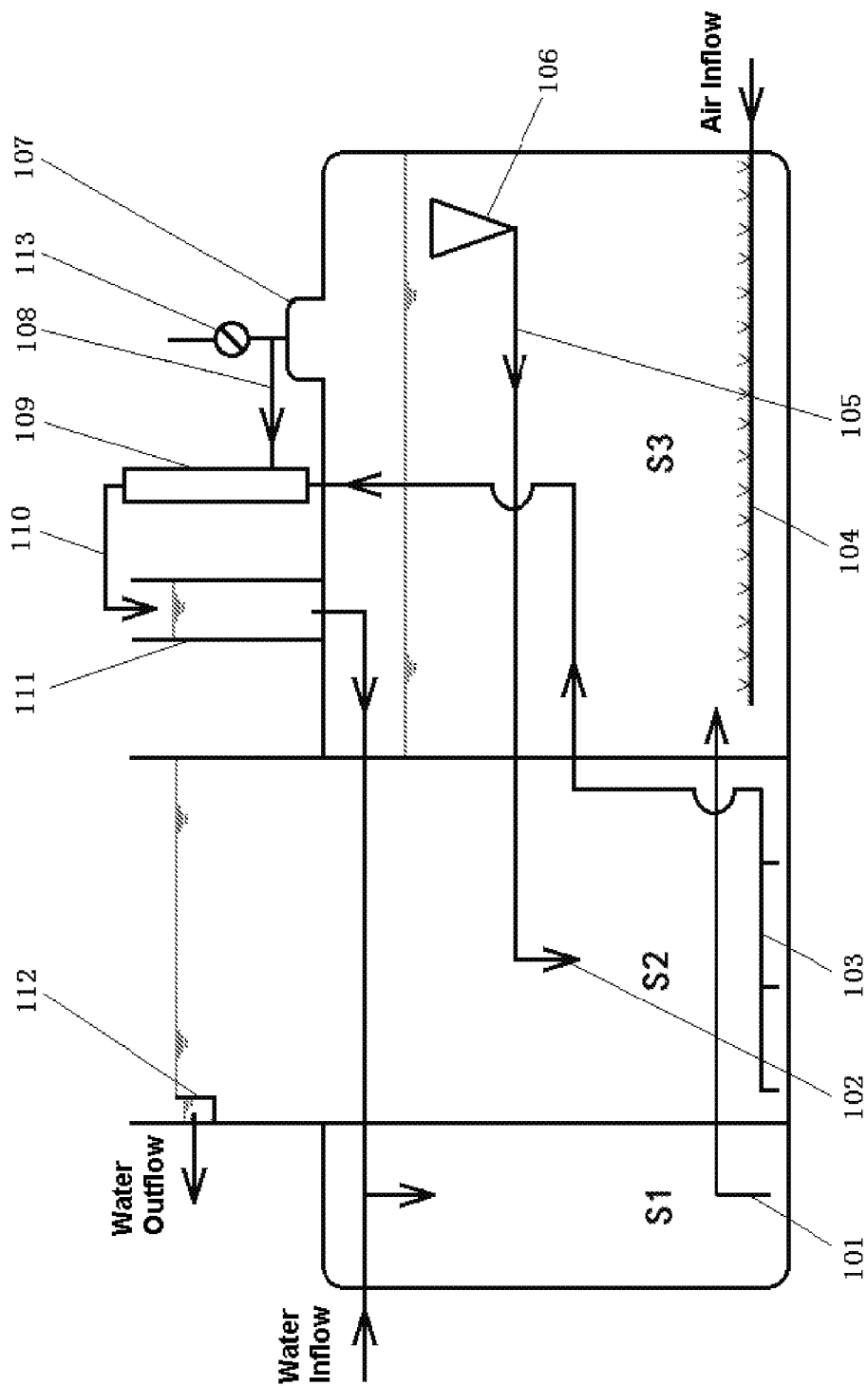
FIG. 1 is a structural diagram of one embodiment of the apparatus for biological sewage treatment of the present invention.

FIG. 1 is a structural diagram of an embodiment of the apparatus for biological sewage treatment of the present invention, in which the apparatus for biological sewage treatment comprises an anaerobic treatment section (S1), a sedimentation section (S2) and an aeration section (S3), which are set in a barrel and separated between each other by division plates.

A sewage feed as water inflow was introduced to the anaerobic treatment section (S1) via a sewage feed supplying device (a sewage pump or a water drawing device, not shown). The sewage feed was mixed in the anaerobic treatment section (S1) with a concentrated mixed liquor from a concentrated mixed liquor driving device (which included a concentrated mixed liquor pipe (103), a guiding tube (109), a gas-liquor mixture pipe (110) and a gas-liquor separator (111)), and passed the anaerobic treatment section (S1) slowly to obtain an anaerobic treatment mixed liquor.

The anaerobic treatment mixed liquor from the anaerobic treatment section (S1) was introduced to the aeration section (S3) via an anaerobic treatment mixed liquor pipe (101), and contacted with an aeration gas from an aerator (104) to perform aeration treatment so as to obtain an aeration treatment mixed liquor. The aeration gas floated upward in the aeration section (S3) and escaped from surface of the aeration treatment mixed liquor and accumulated in the upper part of the aeration section (S3). The aeration treatment mixed liquor passed through a gas-liquor separating device (106) and an aeration treatment mixed liquor pipe (105) and then entered the sedimentation section (S2), in which the gas-liquor separating device (106) had a upward opening to allow the aeration treatment mixed liquor enter the gas-liquor separating device (106), and the opening was located under the surface of the mixed liquor to avoid the aeration gas entering the sedimentation section (S2).

The aeration treatment mixed liquor from the aeration section (S3) was uniformly distributed in the sedimentation section (S2) via a mixed liquor distributor (102), and separated into a supernatant in the upper part of the sedimentation section (S2) and a concentrated mixed liquor in the lower part of the sedimentation section (S2). The supernatant as a water outflow was discharged from an overflow well (112). The concentrated mixed liquor in the lower part of the sedimentation section (S2) returned to the anaerobic treatment section (S1) via a concentrated mixed liquor driving device (which included a concentrated mixed liquor pipe (103), a guiding tube (109), a gas-liquor mixture pipe (110) and a gas-liquor separator (111)).

The aeration gas accumulated in the upper part of the aeration section (S3) entered into the guiding tube (109) via a gas collecting hood (107) and a gas guiding pipe (108). The redundant part of the aeration gas in the gas collecting hood (107) could be vented from vent valve (113). The aeration gas contacted in the guiding tube (109) with the concentrated mixed liquor from the sedimentation section (S2) and was mixed to form a gas-liquor mixture. The gas-liquor mixture moved upward in the guiding tube (109) under the pressure and floating effects of the aeration gas, and entered in the gas-liquor separating device (111) via the gas-liquor mixture pipe (110). The gas-liquor mixture was separated into the concentrated mixed liquor and the aeration gas in the gas-liquor separating device (111), in which the aeration gas was discharged, and the concentrated mixed liquor was introduced into the anaerobic treatment section (S1).

In the apparatus for biological sewage treatment of FIG. 1, the aeration gas was used to drive the concentrated mixed liquor (i.e., sludge) to flow, and thus the concentrated mixed liquor was driven to circulate in the whole apparatus for biological sewage treatment, so that the energy of the gas was sufficiently utilized, in which the flow rate of the sludge return could be regulated and controlled by controlling the flow rate of the aeration gas entering the gas guiding pipe (108) via the vent valve (113). Hence, the energy consumption of the whole apparatus for biological sewage treatment was reduced. In addition, when no sludge return pump was used, the equipment investment was reduced, while the reliability of the apparatus for biological sewage treatment was improved.

In addition, the apparatus for biological sewage treatment of FIG. 1 could be arranged in horizontal type, so that the height of whole apparatus was reduced. In the meantime, the anaerobic treatment section (S1), the sedimentation section (S2) and the aeration section (S3) were integrated together compactly, so that the floor area was reduced, the structure was simplified, and the maintenance was convenient. Hence, the apparatus for biological sewage treatment could be placed underground or semi-underground structure, or installed on a movable platform (for example, on a vehicle) if required, the floor area was reduced, temperature was kept, environment was beautified, and transportation and deployment were convenient.

In the apparatus for biological sewage treatment of FIG. 1, the aeration gas contacted with the concentrated mixed liquor (i.e., active sludge) to oxygenate the sludge during elevation, the oxygenated sludge was then mixed with the sewage feed during anaerobic treatment, so that the denitrification in the anaerobic treatment section (S1) was enhanced, the effects of removing nitrogen and removing COD were improved, the efficiency of sewage treatment increased, and the water quality of the water outflow was improved.

EXAMPLE 2

Figure 2:
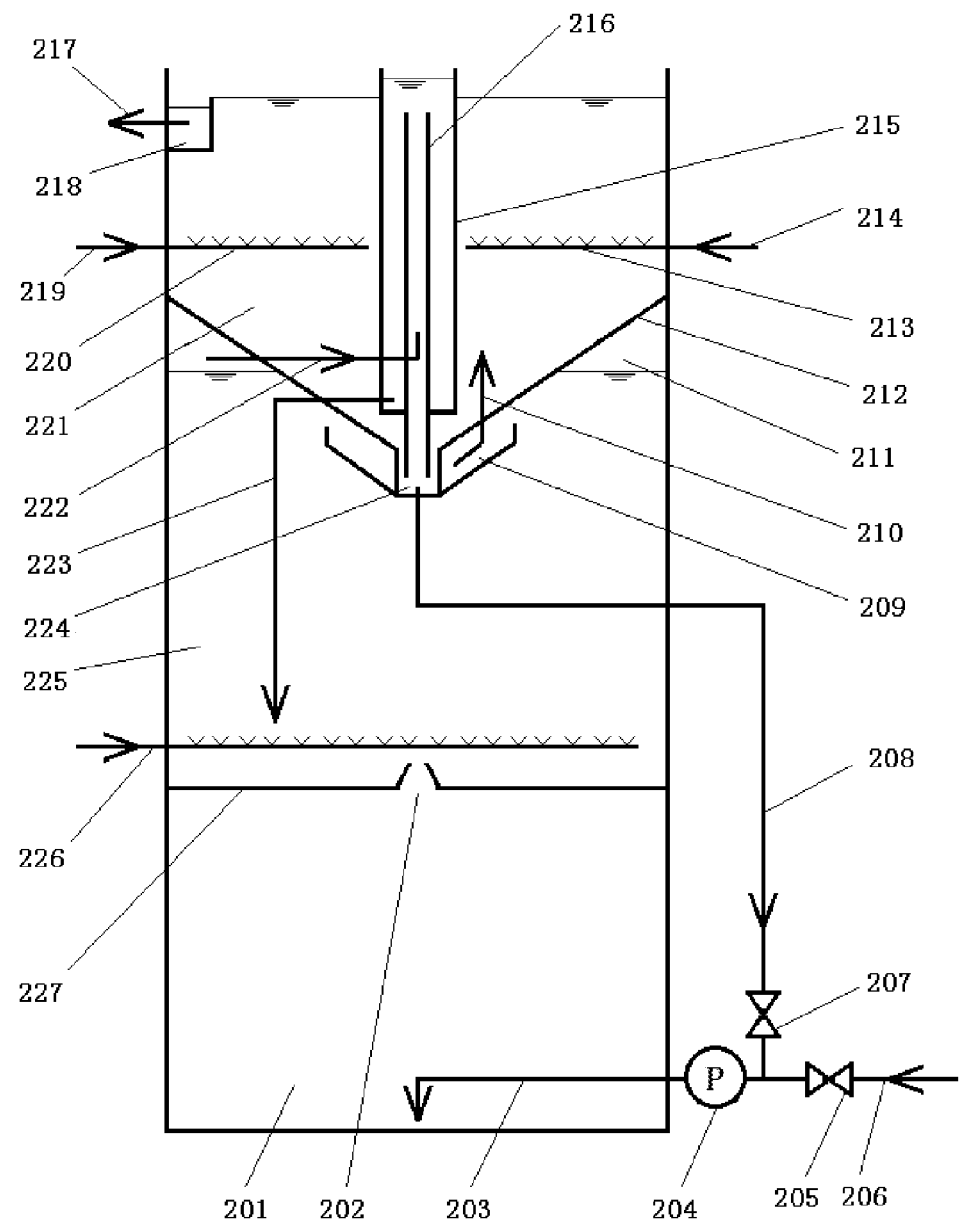
FIG. 2 is a structural diagram of another embodiment of the apparatus for biological sewage treatment of the present invention.

FIG. 2 is a structural diagram of an embodiment of the tower type apparatus for biological sewage treatment of the present invention, in which the tower type apparatus for biological sewage treatment included an anaerobic reaction chamber (201), an aeration chamber (225) as disposed above the anaerobic reaction chamber (201), a sedimentation chamber (221) as disposed above the aeration chamber (225), and a division plate (212) between the aeration chamber (225) and the sedimentation chamber (221). A gas collecting hood (211) was set in the aeration chamber (225) to collect aeration gas, and a liquor collecting tank (209) was set in the aeration chamber (225) to collect the mixed liquor in the aeration chamber (225). A pneumatic mixed liquor elevating tube (216) and a gas-liquor separating tank (215) were set in the sedimentation chamber (221). All these components were arranged in a single cylindrical tower (or polygonal tower) having a height of about 10 m to about 30 m.

A sewage feed from a sewage feed pipe (206) entered the anaerobic reaction chamber (201) via a sewage feed valve (205) and a pump (204). The sewage feed formed a laminar upflow in the anaerobic reaction chamber (201) so that the sludge in the anaerobic reaction chamber (201) stably suspended under balance of flowing and settling to form a sludge bed, and thus the anaerobic reaction chamber (201) became an upflow sludge bed reactor. A clear liquor penetrated the sludge bed and continuously flowed upward and passed through an opening (202) (preferably equipped with an unidirectional passing device, such as an one-way valve) on a division plate (227). Optionally, a gas collecting device (such as a gas collecting hood as described in U.S. Pat. No. 6,063,273, not shown) could be set below the division plate (227) to collect a gas such as methane as generated by the sludge bed.

The clear liquor from the anaerobic reaction chamber (201) was mixed with an aeration treatment mixed liquor in the aeration chamber (225). An aeration gas entered the aeration chamber (225) via a gas inlet pipe (226) and aerated the mixed liquor in the aeration chamber (225). An aerator (not shown) could be set in the aeration chamber (225). After aeration treatment, the aeration gas was accumulated in an annular type gas-collecting hood (211) in the upper part of the aeration chamber (225), while the aeration treatment mixed liquor entered a liquor collecting tank (209), so that the aeration gas and the aeration treatment mixed liquor was separated.

The mixed liquor in the liquor collecting tank (209) entered the lower part of the sedimentation chamber (221) via a through hole or pipe (210), and was separated in the sedimentation chamber (221) to form a supernatant in the upper part thereof and a concentrated mixed liquor in the lower part thereof. The supernatant as water outflow (217) was discharged from an overflow well (218). The concentrated mixed liquor declined and entered a sludge collecting tank (224), and then entered an liquor elevating tube (216) via a lower inlet of the liquor elevating tube (216). The aeration gas in the gas collecting hood (211) entered the liquor elevating tube (216) via a gas guiding pipe (222), so that the concentrated mixed liquor from the sludge collecting tank (224) was drawn and elevated in the liquor elevating tube by the aeration gas from the gas collecting hood (211) in the liquor elevating tube (216). The aeration gas together with the concentrated mixed liquor in the liquor elevating tube (216) then flowed upward and entered a gas-liquor separating tank (215) to perform gas-liquor separation, the separated gas was discharged and the separated concentrated mixed liquor stayed in the gas-liquor separating tank (215). At least a part of the concentrated mixed liquor in the gas-liquor separating tank (215) returned to the lower part of the aeration chamber (225) via a first concentrated mixed liquor return pipe (223).

When the sludge-water interface in the sedimentation chamber (221) was at a relatively high position so that the water quality of water outflow (217) was influenced by sludge, at least a part of the concentrated mixed liquor in the sludge collecting tank (224) could be discharged via a second concentrated mixed liquor return pipe (208), a valve (207) and the pump (204) and entered the anaerobic reaction chamber (201). Thus, the sludge-water interface in the sedimentation chamber (221) could drop and be effectively controlled and regulated by using the valve (207) and the pump (204) to ensure the water quality.

When sludge lump or sludge floating occurred or was about to occur in the sedimentation chamber (221), an aeration gas could enter the middle part of upper part of the sedimentation chamber (221) via gas inlet pipes (219 and 214) and gas distributing tubes (220 and 213), which was used as a sludge lump breaking device, so as to stir the supernatant and/or the concentrated mixed liquor in the sedimentation chamber (221) to break sludge lump or eliminate sludge floating. The aeration gas from the gas inlet pipes (219 and 214) entered the sedimentation chamber (221) periodically or intermittently, and the sewage feed was shut off by closing the valve (205) during this period, so that the sludge would not be discharged with the water outflow (217). After the sludge lump was broken, the aeration gas from the gas inlets (219 and 214) no longer entered the sedimentation chamber (221), the broken sludge lump gradually settled into the sludge collecting tank (224), then entered the aeration (225) via the liquor elevating tube (216), the gas-liquor separating tank (215) and the first concentrated mixed liquor return pipe (223), or entered the anaerobic reaction chamber via the second concentrated mixed liquor return pipe (208). Thus, the sludge lump in the middle part of the upper part of the sedimentation chamber (221) was eliminated, and the sludge floating was prevented.

EXAMPLE 3

Figure 6:
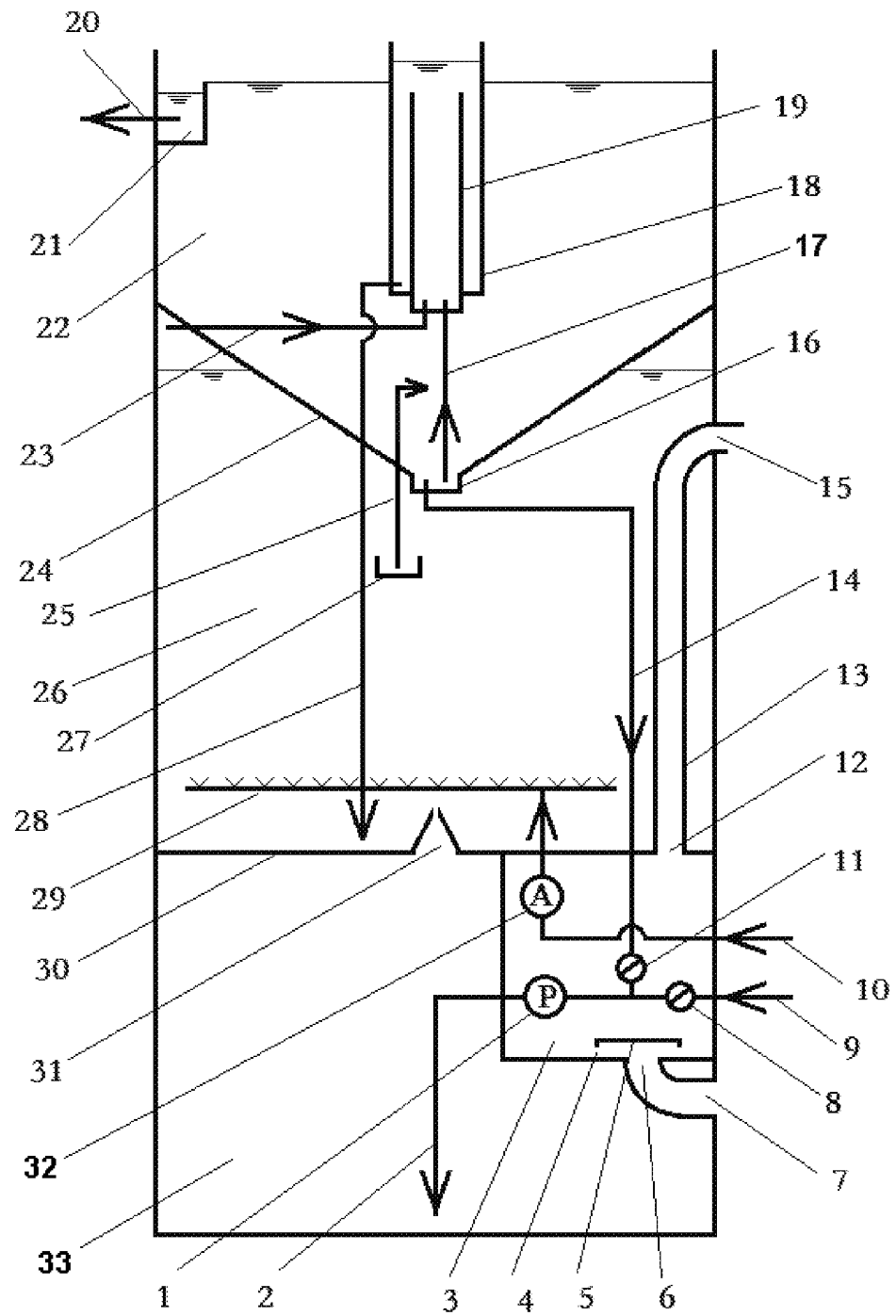
FIG. 6 is a structural diagram of further another embodiment of the apparatus for biological sewage treatment of the present invention.

FIG. 6 is a structural diagram of further another embodiment of the apparatus for biological sewage treatment of the present invention, in which the apparatus for biological sewage treatment was of vertical type, comprising an anaerobic reaction chamber (33), an aerobic reaction chamber or an aeration chamber (26), a separating chamber or a sedimentation chamber (22) and a power chamber or power room (3) as disposed in the anaerobic reaction chamber (33). All these components were arranged in a single cylindrical tower (or polygonal tower) having a height of about 10 m to about 30 m.

A gas inlet (6) was set at the bottom of the power chamber (3). The gas inlet (6) had a gas inlet pipe (7) that extended downward and communicated with atmosphere so that atmospheric air could enter the power chamber (3). A cover plate (5) was set above the gas inlet (6) so that an operator could conveniently move in the power chamber (3). A plurality of air outlets (4) were set at the edge of the cover plate (5) so that the air from the gas inlet (6) could enter the power chamber (3) and optionally was guided toward a power device such as a pump (1) and an air blower (32).

A gas outlet (12) was set at the top of the power chamber (3). In some cases, the top of the power chamber (3) could be a part of a division plate (30). The gas outlet (12) was fluidly connected with the lower part of the heat exchanger (13), and thus was also an gas inlet of the heat exchanger (13). The heat exchanger (13) was set in the aerobic reaction chamber (26). The gas from the gas outlet (12) passed through the heat exchanger (13) to perform heat exchange with the mixed liquor in the aerobic reaction chamber (26), and then was discharged from an outlet (15) at the top of the heat exchanger (13). In some cases, a vent (such as axial flow vent, not shown) could be set at the outlet (15) to enhance the gas flowing in the power chamber (3) and the heat exchanger (13).

Figure 3:
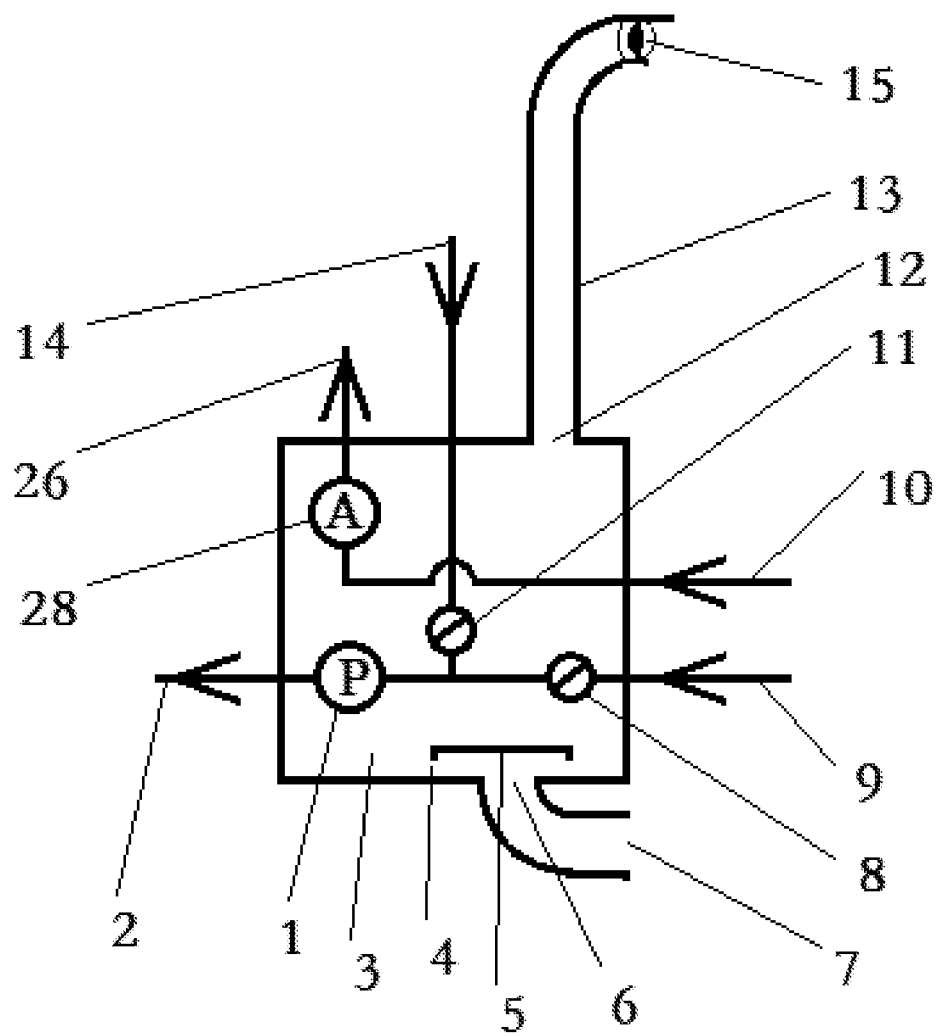
FIG. 3 is a structural diagram of one embodiment of power room and heat exchanger of the apparatus for biological sewage treatment of the present invention.
Figure 4:
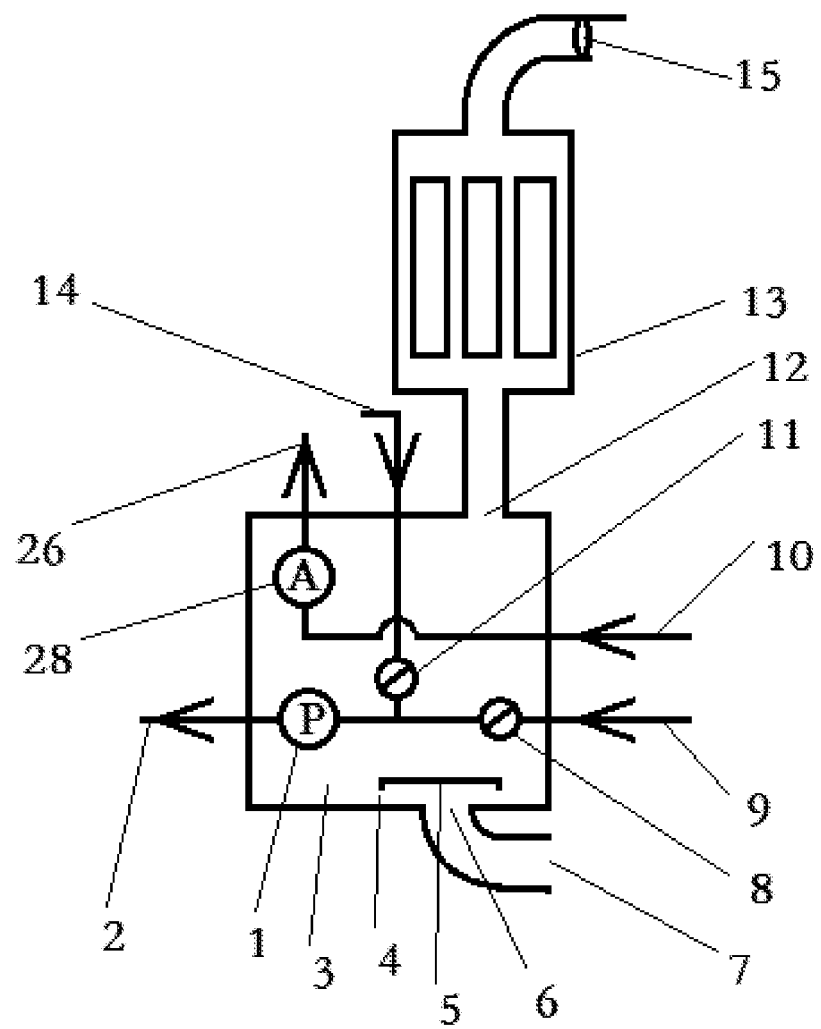
FIG. 4 is a structural diagram of another embodiment of power room and heat exchanger of the apparatus for biological sewage treatment of the present invention.
Figure 5:
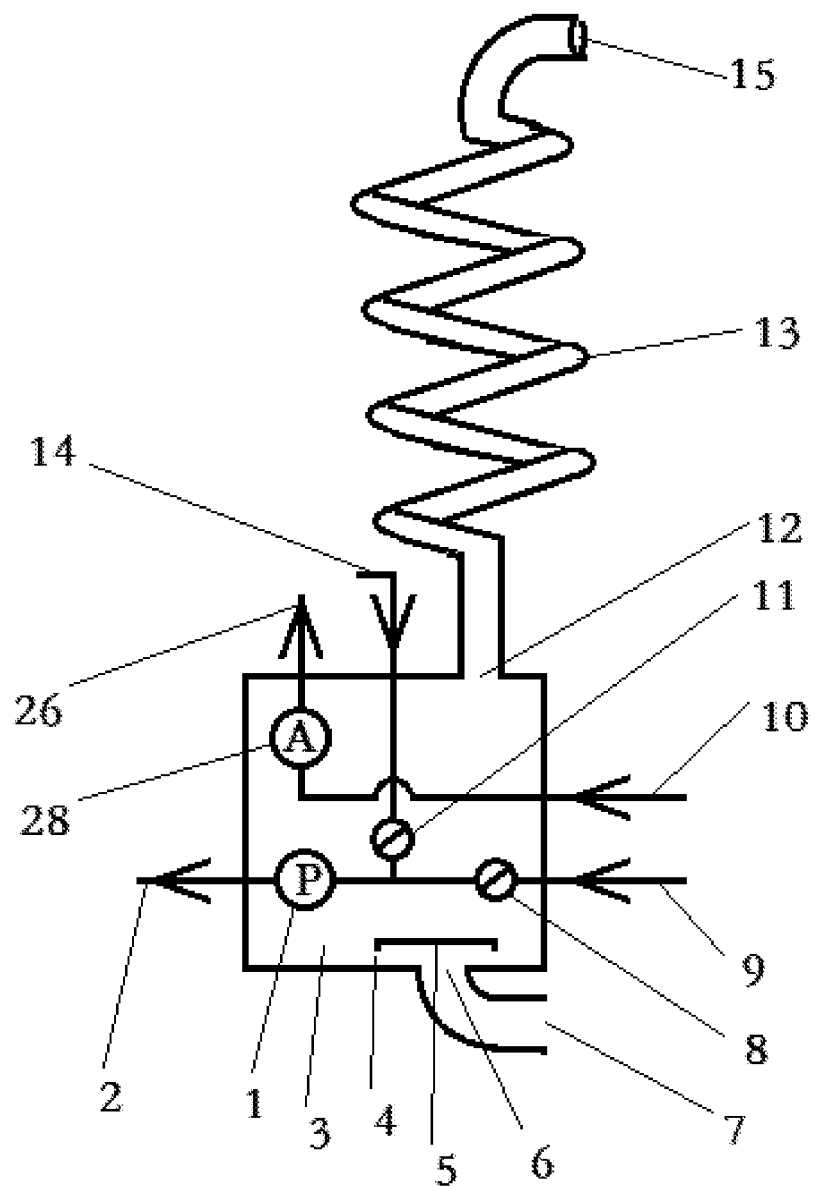
FIG. 5 is a structural diagram of further another embodiment of power room and heat exchanger of the apparatus for biological sewage treatment of the present invention.

The heat exchanger (13) in the apparatus as shown in FIG. 6 can also be a single straight tube heat exchanger (13) as shown in FIG. 3, in which the gas in the tube exchanges heat with the mixed liquor out of the tube; the heat exchanger (13) in the apparatus for biological sewage treatment as shown in FIG. 6 can also be a heat exchanger (13) with a plurality of straight tubes as shown in FIG. 4, in which the gas in the tubes exchanges heat with the mixed liquor out of the tubes; the heat exchanger (13) in the apparatus for biological sewage treatment as shown in FIG. 6 can also be a spiral tube heat exchanger (13) as shown in FIG. 5, in which the gas in the spiral tube exchanges heat with the mixed liquor out of the spiral tube.

A sewage feed from a water inlet pipe (9) entered the anaerobic reaction chamber (33) via a sewage feed valve (8) and the pump (1). The sewage feed formed a laminar upflow in the anaerobic reaction chamber (33) so that the sludge in the anaerobic reaction chamber (33) was stably suspended under balance of flowing and settling to form a sludge bed. A clear liquor penetrated the sludge bed and continuously flowed upward and passed through an opening (31) (preferably equipped with an unidirectional passing device, such as an one-way valve) on the division plate (30) and entered the aerobic reaction chamber (26).

An aeration gas entered the aerobic reaction chamber (26) via a gas inlet pipe (10), an aeration blower (32) and an aeration gas distributor (29) and aerated the mixed liquor in the aerobic reaction chamber (26). A suitable aerator (not shown), such as spiral aerator, micropore aerator, plate-type aerator, rotation mixing aerator, tube aerator, jet aerator, could also be set in the aerobic reaction chamber (26). After aeration treatment, the aeration gas was accumulated in upper part of the aerobic reaction chamber (26), and the mixed liquor of the aerobic reaction chamber (26) entered a liquor collecting tank (27). The mixed liquor in the liquor collecting thank (27) was then introduced to the lower part of the separating chamber (22) via a pipe (25) and separated into a supernatant and a concentrated mixed liquor. The supernatant was discharged as water outflow (20) via an overflow well (21). The concentrated mixed liquor declined to and was collected by a concentrated mixed liquor collecting tank (16), and then drawn via a pipe (17) to a guiding tube (19) by using the aeration gas that was introduced to the guiding tube (19) via a pipe (23). The concentrated mixed liquor and the aeration gas formed a gas-liquor mixture in the guiding tube (19) and flowed upward under the pressure and floating action of the aeration gas. The gas-liquor mixture from the guiding tube (19) was separated to form the aeration gas and the concentrated mixed liquor again in a gas-liquor separator (18), in which the aeration gas was discharged, while the concentrated mixed liquor returned to the lower part of the aerobic reaction chamber (26) via a pipe (28).

When there was sludge lump or sludge floating in the separating chamber (22), the valve (11) was turned on so that a part of the concentrated mixed liquor in the concentrated mixed liquor collecting tank (16) was introduced to the anaerobic reaction chamber (33) via a pipe (14), valve (11), pump (1) and pipe (2), in which the valve (8) was optionally turned off.

During the operation of the apparatus of FIG. 6, the gas in the power chamber (3) was heated by the heat generated by the pump (1) and the air blower (32), the heated gas entered the heat exchanger (13), exchanged heat with the mixed liquor in the aerobic reaction chamber (26), and then was discharged from the outlet (15). The heated mixed liquor in the aerobic reaction chamber (26) could perform aerobic reaction much better. Thus, the heat released by the pump (1) and the air blower (32) was recovered.

In addition, the whole apparatus of FIG. 6 was concise and compact, could be conveniently operated, occupied less area, and was easy for installation and transportation. In the meantime, power devices, monitoring instruments, control switches as well as valves were integrated in the power chamber (3), so that the apparatus could be conveniently, quickly and effectively controlled and monitored.

The apparatus and method for biological sewage treatment of the present invention can quickly and effectively control and regulate the position of the interface between the supernatant and the concentrated mixed liquor in the sedimentation chamber, and thus can prevent or eliminate sludge lump and sludge floating in the sedimentation chamber.

The apparatus and method of the present invention can sufficiently utilize the energy and oxygen of the aeration gas, so that the energy consumption and maintenance cost of whole apparatus are reduced, biological sewage treatment effects are improved, and sludge floating is prevented. In addition, the apparatus and method of present invention also have advantages of high performance, energy saving, high reliability, good movability and miniaturization.

The present invention is illustrated with the above examples. However, those skilled would understand that the present invention is not restricted to these specific examples. The present invention can be modified or changed in many aspects, and all these modifications and changes fall within the protection scope of the present invention.

What is claimed is:

1. An apparatus for biological sewage treatment, comprising:
   a concentrated mixed liquor driving device that drives a concentrated mixed liquor to flow using a gas;
   a sedimentation section that provides the concentrated mixed liquor; an aeration section; and
   an anaerobic treatment section,
   wherein the concentrated mixed liquor driving device comprises a guiding tube to allow the gas to contact with the concentrated mixed liquor, a gas inlet and a concentrated mixed liquor inlet are set at a lower part of the guiding tube, a gas-liquor mixture conveying section is set at a middle part of the guiding tube, and a gas-liquor mixture outlet is set at a upper part of the guiding tube;
   wherein the concentrated mixed liquor driving device further comprises a gas-liquor separating device that is fluidly connected with the gas-liquor mixture outlet,
   wherein the anaerobic treatment section receives a sewage feed and the concentrated mixed liquor from the concentrated mixed liquor driving device and performs anaerobic treatment so as to obtain an anaerobic treatment mixed liquor,
   wherein the aeration section receives the anaerobic treatment mixed liquor and performs an aeration treatment by contacting the anaerobic treatment mixed liquor with an aeration gas so as to obtain an aeration treatment mixed liquor,
   wherein the sedimentation section receives the aeration treatment mixed liquor and performs sedimentation so as to obtain a supernatant and a concentrated mixed liquor, and
   wherein the gas that the concentrated mixed liquor driving device uses to drive the concentrated mixed liquor is the aeration gas collected from the aeration section.

2. The apparatus for biological sewage treatment according to claim 1, wherein the aeration section comprises a gas-liquor separating device that separates the aeration treatment mixed liquor and the aeration gas, the gas-liquor separating device is fluidly connected with the sedimentation section to allow the sedimentation section to receive the aeration treatment mixed liquor, and the gas-liquor separating device is disposed to prevent the aeration gas from entering the sedimentation section.

3. The apparatus for biological sewage treatment according to claim 1, wherein the anaerobic treatment section, the sedimentation section and the aeration section are arranged to form a horizontal type apparatus for biological sewage treatment.

4. The apparatus for biological sewage treatment according to claim 1, wherein at least a part of the apparatus for biological sewage treatment is set below or above the ground, or the apparatus for biological sewage treatment is set on a movable platform.

5. The apparatus for biological sewage treatment according to claim 1, wherein the concentrated mixed liquor driving device is a pneumatic mixed liquor elevating device that elevates the concentrated mixed liquor from the sedimentation section vertically using the gas.

6. The apparatus for biological sewage treatment according to claim 5, wherein the pneumatic mixed liquor elevating device comprises a substantively vertical liquor elevating tube to draw the concentrated mixed liquor, and a gas guiding tube which is fluidly connected with the liquor elevating tube to introduce the gas into the liquor elevating tube.

7. The apparatus for biological sewage treatment according to claim 6, wherein the liquor elevating tube has an inlet for receiving the concentrated mixed liquor and an outlet for discharging the gas and the concentrated mixed liquor, and the gas guiding tube is connected with a middle or lower part of the liquor elevating tube.

8. The apparatus for biological sewage treatment according to claim 6, wherein a sludge collecting channel is located at the bottom of the sedimentation section, and the inlet of the liquor elevating tube extends into the sludge collecting channel.

9. The apparatus for biological sewage treatment according to claim 5, further comprising a gas-liquor separating tank for separating the concentrated mixed liquor and the gas from the pneumatic mixed liquor elevating device.

10. The apparatus for biological sewage treatment according to claim 5, wherein the aeration section has a gas collecting hood to collect an aeration gas in the aeration section, and the gas collecting hood is fluidly connected with the gas guiding tube.

11. The apparatus for biological sewage treatment according to claim 10, wherein the aeration section further has a liquor collecting tank to collect a mixed liquor in the aeration section, and the liquor collecting tank is fluidly connected with the sedimentation section.

12. The apparatus for biological sewage treatment according to claim 10, further comprising a division plate disposed between the aeration section and the sedimentation section, wherein the division plate defines a roof of the liquor collecting tank, and further comprises a hole or a pipeline through which the mixed liquor in the liquor collecting tank enters the sedimentation section.

13. The apparatus for biological sewage treatment according to claim 10, wherein a first concentrated mixed liquor return pipe is disposed between the gas-liquor separating tank and the aeration section for introducing the concentrated mixed liquor of the gas-liquor separating tank into the aeration section.

14. The apparatus for biological sewage treatment according to claim 10, wherein the anaerobic treatment section disposed below the aeration section, wherein a second concentrated mixed liquor return pipe is disposed between the gas-liquor separating tank and the anaerobic treatment section for introducing the concentrated mixed liquor of the gas-liquor separating tank into the anaerobic treatment section.

15. The apparatus for biological sewage treatment according to claim 1, further comprising a power room and a heat exchanger, wherein the heat exchanger uses a heat released from a power device in the power room as a heat source.

16. The apparatus for biological sewage treatment according to claim 15, wherein the power room and the heat exchanger are disposed in more or more locations chosen from the anaerobic treatment section, the aeration section, or the sedimentation section, the power room has at least one power device, a gas inlet fluidly connecting with atmosphere and a gas outlet fluidly connecting with the heat exchanger.

17. The apparatus for biological sewage treatment according to claim 16, wherein the gas inlet has a gas distributor to control the distribution of gas entering into the power room.

18. The apparatus for biological sewage treatment according to claim 1, further comprising a sludge lump breaking device in the sedimentation section.

19. The apparatus for biological sewage treatment according to claim 18, wherein the sludge lump breaking device is an aerator or a gas distributor.

* * * * *